United States Patent
Weh et al.

(10) Patent No.: US 9,982,662 B2
(45) Date of Patent: May 29, 2018

(54) PRESSURE GENERATOR FOR A HYDRAULIC VEHICLE BRAKE SYSTEM

(71) Applicant: Robert Bosch GmbH, Stuttgart (DE)

(72) Inventors: Andreas Weh, Sulzberg (DE); Marc Micke, Boennigheim (DE); Roman Koch, Malsch (DE); Matthias Mayr, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 341 days.

(21) Appl. No.: 14/751,750

(22) Filed: Jun. 26, 2015

(65) Prior Publication Data

US 2015/0377261 A1 Dec. 31, 2015

(30) Foreign Application Priority Data

Jun. 27, 2014 (DE) .................. 10 2014 212 417

(51) Int. Cl.
*B60T 13/74* (2006.01)
*F04B 17/03* (2006.01)
*F04B 9/02* (2006.01)

(52) U.S. Cl.
CPC ............ *F04B 17/03* (2013.01); *B60T 13/745* (2013.01); *F04B 9/02* (2013.01)

(58) Field of Classification Search
CPC ............. F16D 2121/24; F16D 2125/40; F15B 15/068; F04B 9/02; F04B 17/03; B60T 13/745

See application file for complete search history.

(56) References Cited

U.S. PATENT DOCUMENTS

| 6,318,512 B1* | 11/2001 | De Vries ............. F16D 65/18 188/162 |
| 2004/0036370 A1* | 2/2004 | Hilzinger .............. B60T 13/741 310/83 |

FOREIGN PATENT DOCUMENTS

JP H 04-22767 A 1/1992

* cited by examiner

*Primary Examiner* — F. Daniel Lopez
*Assistant Examiner* — Abiy Teka
(74) *Attorney, Agent, or Firm* — Maginot, Moore & Beck LLP

(57) ABSTRACT

A pressure generator for a hydraulic vehicle brake system includes a piston-cylinder unit, a piston, a ball screw drive configured to move the piston, an electric hollow-shaft motor that surrounds and is configured to drive the ball screw drive, and a planetary gear set configured to transmit a rotational movement of the hollow-shaft motor to the ball screw drive. The generator also includes a flange part, a sleeve, and an axial needle-roller bearing. The flange part has a tubular collar configured to axially guide the piston in a movable fashion therein. The sleeve has a flange configured as a counterbearing which is attached to an interior of the tubular collar, and is further configured to support the bearing. The bearing is configured to rotatably mount and axially support the ball screw drive.

8 Claims, 1 Drawing Sheet

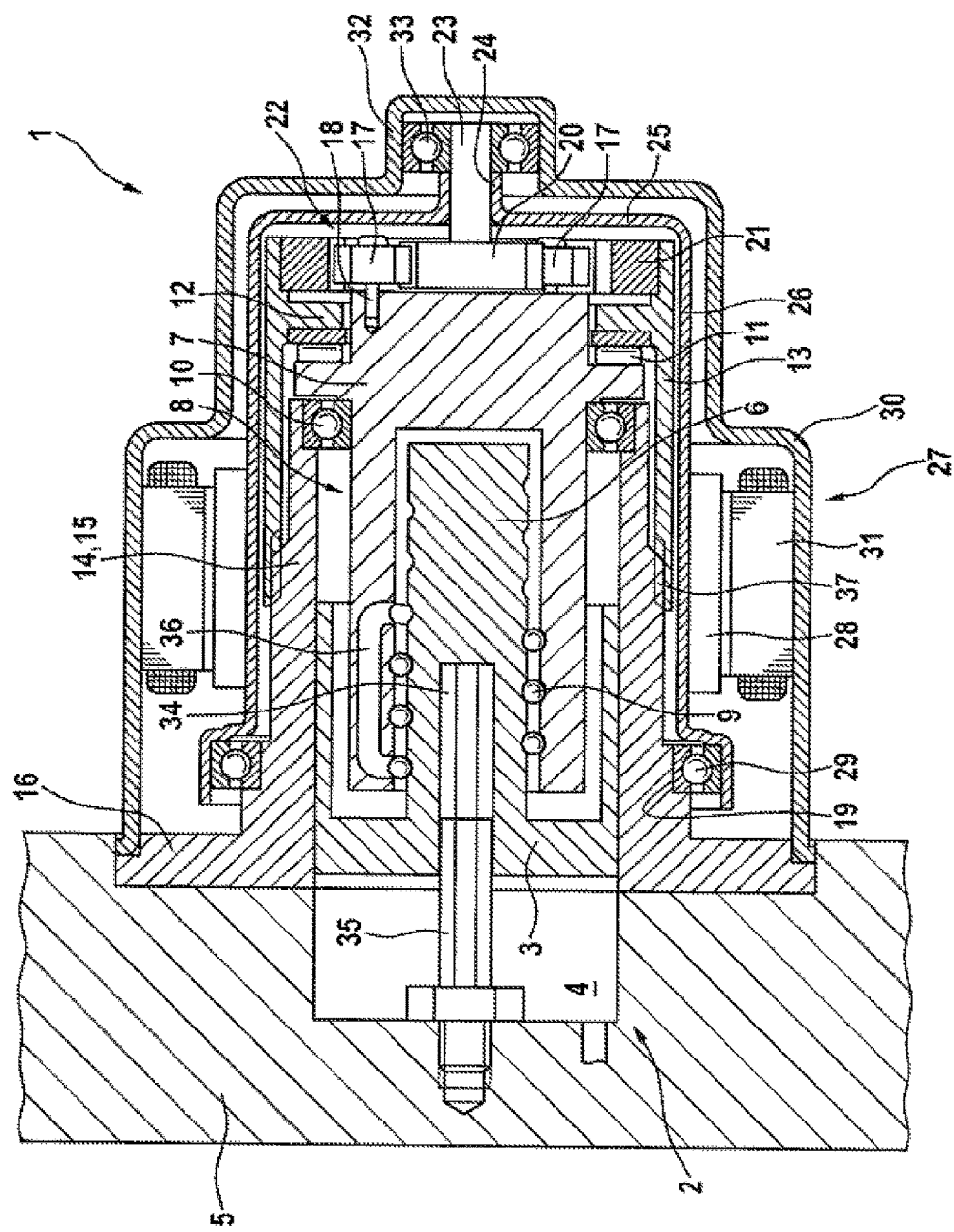

PRESSURE GENERATOR FOR A HYDRAULIC VEHICLE BRAKE SYSTEM

This application claims priority under 35 U.S.C. § 119 to patent application no. DE 10 2014 212 417.4, filed on Jun. 27, 2014 in Germany, the disclosure of which is incorporated herein by reference in its entirety.

The disclosure relates to a pressure generator for a hydraulic vehicle brake system. The pressure generator is provided in particular for a hydraulic power brake system, and can also be used for slip regulation in hydraulic power brake systems, servo brake systems and manual brake systems.

BACKGROUND

The Japanese patent application JP H04 22767 A has disclosed a pressure generator, referred to as a hydraulic plunger pump, with a ball screw drive and a piston-cylinder unit. The ball screw drive has a spindle nut which can be driven in rotation by means of an electric motor and which thus axially moves a spindle, which in turn moves a piston in a cylinder of the piston-cylinder unit. A housing of the ball screw drive is connected by way of tie rods to a cylinder head which holds the cylinder on the housing of the ball screw drive.

SUMMARY

The pressure generator according to the disclosure has a piston-cylinder unit with a cylinder and with a piston which is movable in the cylinder, and has a helical gearing for moving the piston. The helical gearing has a rotatable, axially fixed component which has a thread, and an axially movable, rotationally fixed component which has a counterpart thread, the counterpart thread of which engages directly or indirectly, for example via rolling bodies, with the thread of the rotatable component of the helical gearing. The act of the rotatable component of the helical gearing being driven in rotation causes the axially movable component of the helical gearing to be moved axially. The axially movable component of the helical gearing is axially fixed and radially fixed to the piston of the piston-cylinder unit, such that a movement of the axially movable component of the helical gearing moves the piston in the cylinder of the piston-cylinder unit.

For the connection of the piston-cylinder unit to the helical gearing, the pressure generator according to the disclosure has a flange part with a flange and with a tubular collar. The flange is rigidly connected to the cylinder of the piston-cylinder unit and the collar guides the piston of the piston-cylinder unit coaxially with respect to the cylinder and in axially movable fashion. With the piston, the tubular collar of the flange part according to the disclosure guides the axially movable component of the helical gearing, said axially movable component being radially fixed to the piston of the piston-cylinder unit.

Furthermore, the pressure generator according to the disclosure has an axial bearing which serves for axially supporting and rotatably mounting the rotatable component of the helical gearing. The axial bearing is supported axially on a counterbearing, which is connected axially fixedly to the collar of the flange part.

The disclosure makes it possible to realize a compact pressure generator in which axial tensile and compressive forces which arise during the generation of pressure are conducted as internal forces on short paths from the piston of the piston-cylinder unit to the axially movable component of the helical gearing, to which the piston is axially fixed, from the axially movable component via the counterpart thread and the thread to the rotatable component of the helical gearing, from the latter via the axial bearing and the counterbearing thereof to the flange part, and from the flange part to the cylinder, to which the flange of the flange part is rigidly connected. There is no need for external forces to be supported. A further advantage of the disclosure is the axially movable guidance of the piston, and of that component of the helical gearing which is radially fixed thereto, in the tubular collar of the flange part.

The claims relate to advantageous embodiments and refinements of the disclosure.

In one embodiment, the pressure generator has an electric hollow-shaft motor for driving the rotatable component of the helical gearing in rotation and which surrounds the helical gearing, which permits a compact construction of the pressure generator. A rotary bearing for a hollow shaft of the hollow-shaft motor is preferably arranged on the outside of the tubular collar of the flange part and/or close to the flange of the flange part.

In another embodiment, the generator includes a radial bearing for the rotatable component of the helical gearing on the flange part, which radial bearing is preferably arranged in the tubular collar of the flange part so as to be remote from the flange and thus from the rotary bearing for the hollow shaft of the hollow-shaft motor.

A refinement according to another embodiment provides a planetary gear set for rotational speed reduction and for driving the rotatable component of the helical gearing in rotation.

In a further embodiment, the generator includes a second rotary bearing, arranged remote from the flange, for the hollow shaft of the hollow-shaft motor, which second rotary bearing is arranged remote from the flange and thus preferably remote from the first rotary bearing of the hollow shaft, such that the hollow shaft is rotatably mounted at spaced-apart positions. The second rotary bearing does not need to be arranged on the flange part.

BRIEF DESCRIPTION OF THE DRAWINGS

The disclosure will be discussed in more detail below on the basis of an embodiment of the disclosure which is illustrated in the drawing. The single FIGURE shows an axial section through a pressure generator according to the disclosure.

DETAILED DESCRIPTION

The pressure generator 1 according to the disclosure as illustrated in the drawing serves for generating pressure in a hydraulic power brake system. Said pressure generator may also be used for slip regulation. The pressure generator 1 has a piston-cylinder unit 2 with a piston 3 and with a cylinder 4 which is in the form of a cylindrical countersunk recess in a hydraulic block 5 of the vehicle brake system, which is not otherwise illustrated. The hydraulic block 5 serves for the mechanical mounting and hydraulic interconnection of hydraulic components of a slip regulation system of the vehicle brake system, such as solenoid valves, check valves, hydraulic accumulators and the piston-cylinder unit 2. Hydraulic blocks 5 of said type for vehicle brake systems with slip regulation are known and will not be discussed in any more detail here. In a power brake system, the piston-cylinder unit 2 serves for building up a pressure instead of a foot-operated or hand-operated master brake cylinder, the latter serving as a brake force setpoint value encoder for a power braking operation and being capable of generating a brake pressure for a servo braking operation in the event of failure of the power brake.

The piston 3 of the piston-cylinder unit 2 is in the form of a hollow piston and has a spindle 6 arranged coaxially, and rigidly connected, therein. The spindle 6 is thus axially fixed and radially fixed to the piston 3. The spindle 6 is arranged coaxially in a spindle nut 7 which projects into the piston 3 of hollow form. The act of the rotatable and axially fixed spindle nut 7 being driven in rotation causes the spindle 6, and with it the piston 3, to be moved axially, such that the piston 3 generates a hydraulic pressure in the cylinder 4. Together, the spindle 6 and the spindle nut 7 form a helical gearing 8. In the illustrated embodiment, the helical gearing is in the form of a ball screw drive with a ball return channel 36 and with balls 9 as rolling bodies which roll in helical grooves formed as a thread and counterpart thread on the spindle 6 and in the spindle nut 7. In general, the spindle 6 and the spindle nut 7 may be regarded as being components of the helical gearing 8, wherein the spindle nut 7 forms a rotatable, axially fixed component, which has a thread, of the helical gearing 8, and the spindle 6 forms an axially displaceable, rotationally conjoint component, which has a counterpart thread, of the helical gearing 8. In the embodiment as a ball screw, the thread of the spindle nut 7 and the counterpart thread of the spindle 6 are in indirect engagement by way of the balls 9, such that as already described, the act of the spindle nut 7 being driven in rotation causes the spindle 6 together with the piston 3 to be moved axially. In embodiments of the disclosure, a reversed situation is also conceivable, that is to say a rotatable and axially fixed spindle and a rotationally fixed and axially movable spindle nut (not illustrated), wherein in this case, the spindle nut is connected to, and is for example also integral with, the piston 3 and moves the latter when the spindle is driven in rotation. For rotational fixing, the piston 3 and the spindle 6 have an axial blind bore 34 with a hexagonal cross section, into which there projects a hexagonal bar 35 which is screwed rotationally fixedly into the hydraulic block 5 at the base of the cylinder 4.

The spindle nut 7 is rotatably mounted by way of a radial bearing 10 in a tubular collar 14 of a flange part 15, and is supported axially and rotatably by way of an axial bearing 11, which in the embodiment is in the form of a needle-roller bearing, on a flange, which in this case is referred to as counterbearing 12 and which is arranged in a sleeve 13. Instead of a needle-roller bearing, it is for example also possible for a ball bearing, even a four-point bearing, or a plain bearing to be used as an axial bearing (not illustrated). This list is exemplary and not exhaustive. In the embodiment, the radial bearing 10 and the axial bearing 11 are arranged at an end of the spindle nut 7 which is remote from the piston 3. The sleeve 13 has a thread 37 by means of which it is screwed onto a counterpart thread of the tubular collar 14 of the flange part 15, that is to say fixedly connected to the collar 14.

The flange part 15 has a flange 16 which is fastened in a countersunk recess of the hydraulic block 5. The flange part 15 is coaxial with the cylinder 4, the piston 3, the spindle 6 and the spindle nut 7. The collar 14 of the flange part 15 guides the piston 3 coaxially with respect to the cylinder 4 and in axially displaceable fashion. Via the piston 3, the collar 14 of the flange part 15 guides the spindle 6, which is rigidly and thus radially fixedly connected to the piston 3, of the helical gearing 8 coaxially with respect to the cylinder 4 and with respect to the spindle nut 7 and in axially displaceable fashion. If the piston 3 is moved into the cylinder 4 for the purposes of generating pressure, a compressive force acts on the spindle 6 and on the spindle nut 7, which compressive force is supported axially, via the axial bearing 11, on the counterbearing 12 in the sleeve 13. The sleeve 13, which is screwed to the collar 14 of the flange part 15, conducts a tensile force, which arises as a reaction force to the compressive forces in the spindle 6 and the spindle nut 7, into the hydraulic block 5, which has the cylinder 4 of the piston-cylinder unit 2, via the flange part 15 which is fastened to the hydraulic block 5. The compressive and tensile forces that arise during the generation of pressure are thus conducted on a short path as internal forces in a closed loop, such that there are no outwardly acting forces that must be supported.

The spindle nut 7 has, on its end remote from the piston 3, three planet gears 17 which are arranged rotatably on the spindle nut 7 by means of pins 18. In this way, the spindle nut 7 forms a planet carrier for the planet gears 17. The planet gears 17 mesh with a coaxially arranged sun gear 20 and with a likewise coaxial internal gear 21, which surrounds the planet gears 17. The internal gear 21 is, at an end remote from the flange 16 of the flange part 15 and from the hydraulic block 5 with the cylinder 4, pressed into the sleeve 13, that is to say the internal gear 21 is rotationally conjoint. The planet gears 17, the sun gear 20 and the internal gear 21 form a planetary gear set 22 of the pressure generator 1 according to the disclosure, which planetary gear set serves for driving the spindle nut 7 in rotation.

The sun gear 20 is rotationally conjoint with a shaft 23 which is pressed rotationally conjointly into a collar 24 in a face wall 25 of a cup-shaped hollow shaft 26 of an electric hollow-shaft motor 27. The hollow shaft 26 has poles or permanent magnets 28 at the outside, and may also be regarded as the rotor of the electric hollow-shaft motor 27. The hollow shaft 26 concentrically surrounds the planetary gear set 22, the helical gearing 8, the sleeve 13 and the collar 14 of the flange part 15. Said hollow shaft is rotatably mounted, close to the flange 16, by way of a ball bearing as rotary bearing 29. The rotary bearing 29, which is close to the flange, of the hollow shaft 26 is pressed onto a bearing seat 19 on the outside of the flange part 15 close to the flange 16.

The electric hollow-shaft motor 27 has a motor housing 30, which is likewise cup-shaped and of stepped diameter and the open end of which is fastened to the flange 16 of the flange part 15. At an inner side, the housing 30 has electromagnets as stator magnets 31. The motor housing 30 with the stator magnets 31 can also be regarded as the stator of the electric hollow-shaft motor 27. At a closed end remote from the flange 16, there is formed on the motor housing 30 a hollow cylindrical bearing receptacle 32 in which there is arranged a ball bearing as rotary bearing 33. The rotary bearing 33 serves for rotatably mounting the shaft 23, with which the sun gear 20 of the planetary gear set 22 is rotationally conjoint and which is rotationally conjoint with the hollow shaft 26 by being pressed into the collar 24 of the hollow shaft 26. The rotary bearing 23 thus serves for rotatably mounting both the hollow shaft 26 of the electric hollow-shaft motor 27 at the end remote from the flange 16, and at the same time also for rotatably mounting the sun gear 20 of the planetary gear set 22. When the hollow shaft 26 of the electric hollow-shaft motor 27 is driven in rotation, the sun gear 20, which is rotationally conjoint with the hollow shaft 26, of the planetary gear set 22 is driven in rotation and drives the planet gears 17 such that they perform a revolving movement, which causes the spindle nut 7, which as described simultaneously forms the planet carrier of the planetary gear set 22, to be driven in rotation.

What is claimed is:

1. A pressure generator for a hydraulic vehicle brake system, comprising:
   a piston-cylinder unit that includes:
      a hydraulic block defining a cylinder; and
      a piston that is configured to move in to and out of the cylinder so as to generate a hydraulic pressure;
   a helical gearing that includes:
      a rotatable, axially fixed first component that has a thread; and
      an axially moveable, rotationally fixed second component that has a counterpart thread and that is axially and radially fixed to the piston, wherein the counterpart thread is engaged with the thread of the first component such that driving the first component in rotation causes the second component and the piston to be moved;
   a flange part separate from the hydraulic block that includes:
      a flange that is rigidly connected to the hydraulic block; and
      a tubular collar configured to guide the piston coaxially with respect to the cylinder in an axially movable fashion;
   an axial bearing that axially supports the first component; and
   a counterbearing for the axial bearing that is axially fixed to the collar, and that axially supports the axial bearing.

2. The pressure generator according to claim 1, further comprising:
   an electric hollow-shaft motor configured to drive the first component in rotation, wherein:
      the electric hollow-shaft motor surrounds the helical gearing; and
      the flange part further includes a rotary bearing configured to rotatably mount a hollow shaft of the hollow-shaft motor.

3. The pressure generator according to claim 2, wherein:
   the rotary bearing is positioned on the flange part;
   the hollow shaft includes a second rotary bearing that is configured to rotatably mount the flange part; and
   the rotary bearing is axially closer to the flange than the second rotary bearing.

4. The pressure generator according to claim 2, wherein the hollow-shaft motor includes a stator that is positioned on the flange part coaxially with respect to the helical gearing.

5. The pressure generator according to claim 1, wherein the flange part further includes a radial bearing configured to rotatably mount the first component.

6. The pressure generator according to claim 1, wherein:
   the first component includes a spindle nut; and
   the second component includes a spindle.

7. The pressure generator according to claim 1, wherein the helical gearing includes a roller-type screw drive with rolling bodies, wherein the thread of the first component engages with the counterpart thread of the second component via the roller bodies.

8. The pressure generator according to claim 1, further comprising:
   a planetary gear set configured to drive the helical gearing in rotation, wherein a drive output of the planetary gear set is rotationally conjoint with the first component.

* * * * *